B. R. SINGLETON,

Assignor by mesne assignments to H. S. Hopkins & W. McCully.

LOW-WATER ALARM AND FIRE-EXTINGUISHER.

No. 7,767. Reissued June 26, 1877.

WITNESSES.

Paul Bakewell

Geo. S. Boyd.

INVENTOR.

Benjamin R. Singleton

By Chas. D. Moody.

his atty.

N. PETERS, PHOTO-LITHOGRAPHER, WASHINGTON, D. C.

UNITED STATES PATENT OFFICE.

BENJAMIN R. SINGLETON, OF HIGHLAND, ILLINOIS, ASSIGNOR, BY MESNE ASSIGNMENTS, TO HENRY S. HOPKINS AND WILLIAM McCULLY.

IMPROVEMENT IN LOW-WATER ALARM AND FIRE-EXTINGUISHER.

Specification forming part of Letters Patent No. 123,795, dated February 20, 1872; reissue No. 7,767, dated June 26, 1877; application filed March 3, 1877.

*To all whom it may concern:*

Be it known that I, BENJAMIN R. SINGLETON, formerly of St. Louis, Missouri, and now of Highland, Madison county, Illinois, have made new and useful Improvements in Steam-Boiler Low-Water Alarms and Fire-Extinguishers, of which the following is a full, clear, and exact description, reference being had to the annexed drawing, making part of this specification, in which—

Figure 1:
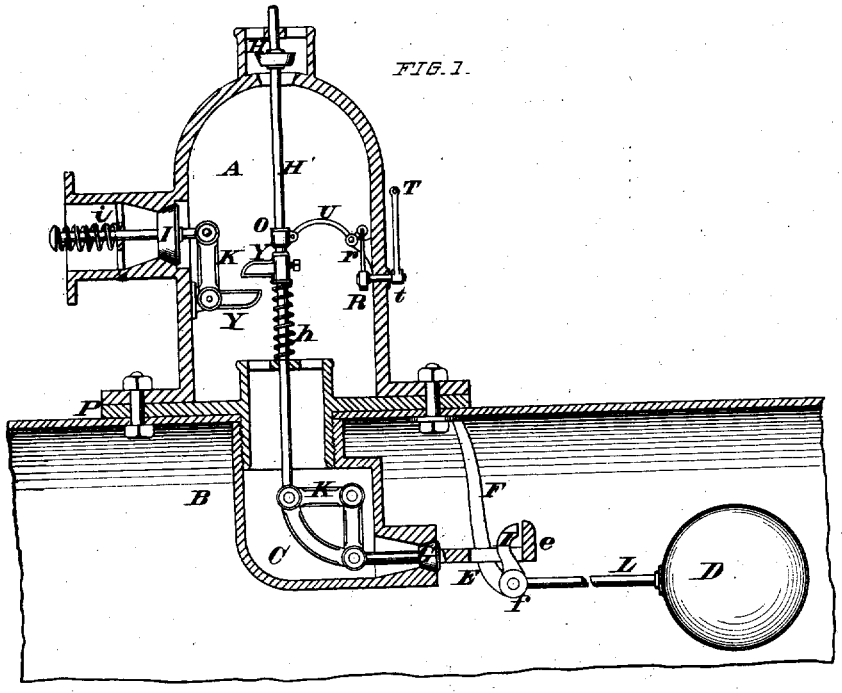
Figure 2:
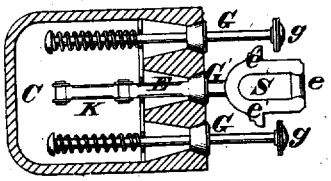

Figure 1 is a vertical section, showing the invention in position; Fig. 2, a horizontal section taken through that part of the invention termed the "gage-box;" and Figs. 3 and 4, respectively, a front and a side elevation of the latter.

The same letters in the various figures denote the same parts.

My invention relates to an improvement in that class of steam-boiler low-water alarms wherein the movement of a float is the cause of the operation of the alarm. It further has reference to the means for extinguishing or checking the boiler-fire, substantially as herein set forth, and to the provision for readily testing the alarm and extinguisher, and for operating an auxiliary alarm.

Referring to the annexed drawing, A represents a dome of a suitable size and shape—say, eight inches in diameter and twelve inches in height—that is attached to the boiler B. C represents what I term the "gage" or "valve box." It is arranged within the boiler, in the steam-space thereof, and underneath or opposite the dome, and the boiler-shell is perforated or removed between the box and dome to establish communication between them, and to provide for the movement of the valve-stem, as hereinafter explained.

The mode of fixing the box C in position is as shown. A plate, P, that is interposed between the dome A and boiler-shell, is provided with a boss, *p*, that projects downward through the perforation in the boiler-shell between the dome and gage-box into the boiler, and is furnished with a thread to enable the gage-box to be screwed thereon.

The box C is of suitable form, and is inclosed from the boiler, saving that it is provided with the valves G′ G G, that can be opened to admit steam from the boiler into the box. The central valve G′ is attached to a rod, E.

D represents a float, that rises and falls with the water in the boiler. It is attached to a lever, L, that is pivoted at *f* to a bracket, F, so as to cause the downward movement of the float to bring the lever L against the rod E, drawing it outward from the gage-box and opening the valve G′.

The mode of bringing the lever L to bear upon the box E is by means of an arm, L′, with which the lever L is provided. The bar E is slotted to receive the arm L′, and its inner end is enlarged to form a projection, *e*, against which the upper end of the arm L′ strikes. The rod E, at its inner end, and which is within the gage-box, is pivoted to one arm of a bell-crank lever, K, that, in turn, is pivoted to the box C, and whose other arm is pivoted to a valve-stem, H′, that extends thence upward into and through the dome A, and at its upper end furnished with a valve, H, that serves to open and close an opening in the dome leading to an alarm-whistle. (Not shown.) The stem is also provided with an arm, Y, arranged to come (as hereinafter explained) against and move the arm Y′ of another bell-crank lever, K′, whose other arm is pivoted to the stem of a valve I, that, in turn, serves to open and close a pipe that leads (only the upper end of this pipe is shown) to the boiler-furnace chamber, and so that steam can be discharged therefrom onto the fire. The valve I is seated in the direction shown, and a spring, *i*, aids in keeping it closed, saving when the crank K′ is not moved.

There is another spring, *h*, arranged between the arm Y and the bearing *p* to aid in keeping the valve G′ shut, saving when the latter is brought into use, and as follows: As the float D falls with the water in the boiler, the lever L draws against the rod E. This opens the valve G′ and draws the rod H downward. The various parts are so adjusted as to open the valve G′ before the arm Y comes in contact with the arm Y′, and before the valve H is closed. Steam, being admitted into the box C and dome A, thence passes by the valve H to the alarm-whistle, operating the latter;

or, if desired, this steam may be conducted to a suitable pump to supply more water to the boiler. The sounding of the whistle is intended more especially as a primary warning; but if the water continues to fall the stem H′ is drawn farther down, bringing the arm Y against the crank K′ and opening the valve I. Steam then passes from the boiler through the box C, dome A, and pipe J, to the furnace-chamber of the boiler, checking and extinguishing the fire. The valves H and I are not, however, necessarily coactive, either being thoroughly operative, whether the other is in action or not. Therefore the valve H may be omitted from the construction without impairing the efficiency of the fire-extinguishing device, and in practice sufficient steam escapes through the dome to operate both the alarm and the extinguisher.

An additional feature of the improvement, and that can be used either as an auxiliary alarm, or as a means for testing the working condition of the invention generally, is shown in Fig. 1. O represents a sleeve attached to the stem H′, and connected to a rod, U, that, through a cam-rod, *r*, cam R, rock-shaft *t*, (that passes through the shell of the dome,) is connected with a lever, T, to which a rope, chain, or rod may be attached, and to bring the lever readily within reach. Now, as the stem H′ descends the sleeve O is brought down with it, causing the lever T to move and sound a bell, gong, or other alarm. By moving the lever, on the other hand, motion may be transmitted from without the dome to the stem H′, and to the valves G′ and I, testing the condition of the latter by the sounding of the whistle and the appearance of steam in the furnace-chamber.

Figure 3:
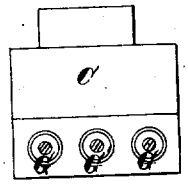
Figure 4:
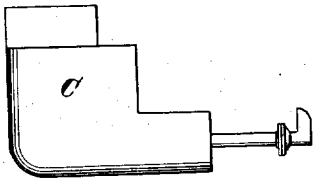

Another feature of the improvement is shown in Figs. 2, 3, and 4, viz., the additional valves G G. They serve to open and close additional openings from the boiler into the gage-box, and are operated by means of the bosses *e′ e′* on the rod *e* coming against the heads *g g* on the stems of the valves. The arrangement is such as to open the various valves G′ and G G successively. Springs *g′ g′* aid in closing the valves G G.

What I claim is—

1. The combination of the float D, bent lever L, slotted bar E, projections *e e′ e′*, and valves G G G′, substantially as and for the purpose described.

2. The combination of the float D, lever L, bar E, bell-cranks K K′, valve-stem H′, valves H and I, and springs *h* and *i*, substantially as and for the purpose specified.

3. The combination of the float D, lever L, bar E, crank K, stem H′, sleeve O, levers or bars U *r*, cam R, shaft *t*, and lever T, substantially as and for the purpose described.

4. The combination of the lever T, shaft *t*, cam R, rod *r*, rod U, sleeve O, stem H′, arm Y, crank K, and valve I, substantially as described.

5. The combination of the float D, lever L, rod E, projection *e*, gage-box C, and valve G′, substantially as described.

6. The combination of the lever T, shaft *t*, cam R, rods *r* U, sleeve O, stem H′, and dome A, substantially as described.

7. The combination of the box C, plate P, bearing *p*, arm Y, valve G′, lever K, stem H′, and spring *h*, substantially as described.

8. The combination of the levers K K′, stem H′, arm Y, rod E, lever L, float D, and valve I, substantially as described.

BENJAMIN R. SINGLETON.

Witnesses:

JACOB E. SCHMITT,
F. M. KYLE.